United States Patent [19]

Beyer et al.

[11] Patent Number: 5,026,208
[45] Date of Patent: Jun. 25, 1991

[54] PROCESS FOR THE DISPOSAL OF WASTE

[75] Inventors: Joachim Beyer, Odenthal; Bernd Koglin, Bergisch-Gladbach; Rolf Rink, Cologne; John-Edwin Roth, Bergisch-Gladbach, all of Fed. Rep. of Germany

[73] Assignee: Bayer Aktiengesellschaft, Leverkusen, Fed. Rep. of Germany

[21] Appl. No.: 441,803

[22] Filed: Nov. 27, 1989

[30] Foreign Application Priority Data

Dec. 15, 1988 [DE] Fed. Rep. of Germany ....... 3842215

[51] Int. Cl.$^5$ .............................................. E02D 3/08
[52] U.S. Cl. .................................... 405/129; 405/128
[58] Field of Search ............... 405/128, 129, 303, 258; 210/688, 751, 747; 52/596

[56] References Cited

U.S. PATENT DOCUMENTS

| | | | |
|---|---|---|---|
| 2,961,399 | 11/1960 | Alberti | 405/128 X |
| 3,583,164 | 6/1971 | Sherrill | 405/129 |
| 3,597,927 | 8/1971 | Hemphill | 405/129 |
| 3,705,851 | 12/1972 | Brauer | 405/129 X |
| 3,762,454 | 10/1973 | Wilkins | 405/129 X |
| 4,525,100 | 6/1985 | Zawadzki et al. | 405/129 |
| 4,834,300 | 5/1989 | Wojciechowski et al. | 405/129 X |
| 4,844,840 | 7/1989 | Feizollahi | 405/129 X |
| 4,859,367 | 8/1989 | Davidovits | 405/129 X |
| 4,897,221 | 1/1990 | Manchak | 405/129 X |
| 4,909,667 | 3/1990 | DeMello | 405/129 X |

*Primary Examiner*—Dennis L. Taylor
*Attorney, Agent, or Firm*—Sprung Horn Kramer & Woods

[57] ABSTRACT

The accumulated waste is pressed under high pressure to form blocks or boards having high strength, low elutability and low permeability, then packed in film individually or in stacks in a dust-tight and water-tight manner and deposited in this form on a dump like building bricks. The process can be used universally for all waste which is available as bulk material and has no coarse components, such as stones, metal pieces and the like.

23 Claims, 5 Drawing Sheets

PROCESS FOR THE DISPOSAL OF WASTE

BACKGROUND OF THE INVENTION

According the of the art, waste is transported to the dump by vehicles and compacted to the highest possible density after delivery or unloading and/or pretreatment. The compacting is carried out using rammer foot compacters and caterpillar tracks. When compacting surfaces, the waste is spread on horizontal or inclined working surface and comminuted by ramming several times with the rammer foot compacter, pressed together and compacted. For co-compacting non-comminutable bulky waste and muds, a tipping edge compacter can also be used temporarily. In the process the solid waste is compacted so that it is pushed from the part of the working surface which is already compacted over a so-called tipping edge. The solid waste is thus removed approximately 10 m in front of the tipping edge, comminuted by ramming several times and only then pushed over the tipping edge. The incline thus formed should be compacted and covered at least at the end of the working day. Bulky waste and muds are unloaded at the foot of the tipping edge and are showered with material from above.

In spite of the compacting measures described, subsidence still occurs in the body of the dump over a long period when material is no longer added. This has an unfavourable effect on the surface and intermediate covers and on shaft and channel systems. Part of the subsidence, caused by mechanical processes, can be anticipated by subsequent deep compaction of the dump body.

This compaction technique comprises in allowing falling masses of, for example 20 tonnes, to fall from, for example 20 m onto the waste surface, as a result of which loading pulses are produced which should effect compaction to a great depth. However, when using this process, installations, such as base sealing, a drainage system and a gas-removing system, in the dump body, must be taken into account. Distances between a compacting point and the abovementioned devices should be at least 10 m vertically and horizontally. This compacting technique should therefore be virtually excluded if permanent intermediate seals are incorporated into the dump body in layers approximately every 10 m.

The possibility of pretreatment of waste before disposal is also known. Hence, certain waste materials must be pretreated before they can be deposited on a dump. Chemico-physical treatment plants are used for pretreatment purposes, such as for example neutralising, detoxification, drainage, solidifying.

Chemico-physical treatment plants (CPT) are—as a rule fixed (but also mobile)—plants having technical devices for chemical and physical treatment of waste (without combustion and pyrolysis), the aims of which are utilisation and/or environmentally acceptable waste management.

CPT have the aim of treating waste, in particular special waste, under the following guidelines:
as high as possible utilisation
reducing the amount of waste to be disposed of
reducing the danger potential
making further treatment and utilisation steps possible (for example combustion) or other environmentally acceptable waste management (for example disposal).

Various chemical and physical processes are suitable for the treatment, individually or in combination. They are essentially the following processes:

Physical processes

Sorting
Emptying of units
Drainage
Conditioning
Centrifuging
Flotation
Drying
Evaporation
Distillation
Thermal emulsion cleavage
Ultrafiltration
Reverse osmosis
Adsorption
Stripping Chemical processes Chemical emulsion cleavage
Ion exchange
Neutralisation
Precipitation
Oxidation
Reduction
Cementation The primary requirement for erecting and operating a dump is to avoid environmental pollution in accordance with the state of the art.

This requirement is met in accordance with the present state of the art by various additional measures which require great care and considerable cost:

Shafts and channels must be installed in a particularly protected manner because of the as yet unavoidable subsidence. Shafts are surrounded, for example by a gravel ring of at least 1 m thickness. It is proposed that shafts be layed not in the incline, but in the flat part of the dump or even outside the dump.

As a result of the subsidence to be expected in accordance with the present state of the art, the surface inclines must be laid to be essentially steeper than are required in the final state, so that the required water drainage is still guaranteed even after subsidence.

The permeability and the elutability of the waste disposed in accordance with the state of the art, are so large that drainage water from household waste and special waste dumps has to be subjected to treatment in each case. The composition of drainage water from 14 typical special waste dumps having a variety of material was carried out by the Bavarian Regional Institute for Water Research at the request of the Federal Minister for the Environment, Nature Conservancy and Reactor Safety. The individual results were summarised to give so-called typical drainage water. For example, the average value for exhaust steam is 64.4 g/l, for CSB (chemical oxygen requirement) 7,869 mg $O_2$/l and for $BSB_5$ (biochemical oxygen requirement in 5 days per liter of water) 4,789 mg $O_2$/l.

According to present knowledge, the amounts of drainage water can be determined as a function of the degree of compaction of the dump. For example, the amount of drainage water from household rubbish dumps when compacting with caterpillar tracks is approximately 40% of the annual precipitation rate (corresponding to approximately 9 m$^3$/hectare x d at 750 mm precipitation/annum) and for compaction using compacters (rammer foot compacters) approximately 25% of the annual precipitation rate.

SUMMARY OF THE INVENTION

Starting from this state of the art, a process was developed for disposing of waste in a form stable to subsidence, elution and permeation, which form is characterised according to the invention in that the waste is pressed under high pressure to form blocks or boards having high strength, low elutability and low permeability, is packed securely in film individually or in stacks in a dust-tight and water-tight manner, transported to the dump in this form and is deposited there arranged like building bricks.

Preferred embodiments and variations of this process are described in the sub-claims.

The process of the invention is explained below in more detail using the drawings, in which

BRIEF DESCRIPTION OF THE DRAWINGS

FIGS. 2a and 2b show standard and balancing blocks of waste according to the invention.

DETAILED DESCRIPTION OF THE INVENTION

The process of the invention in many cases presupposes pretreatment of the waste to bring it into a form which can be compacted well by pressing, or to remove interfering portions. This pretreatment includes, for example removing moisture using filter presses, membrane filter presses, travelling filter presses, solid bowl spiral centrifuges, sieve centrifuges, filter centrifuges and other machines and units which have proved suitable for mechanical removal of water, comminution using jaw crushers, roller mills, ball mills, rotor/stator mills and other mills which have proved to be suitable, classifying using sieves and air separators, sorting using magnetic separators, air separators or other known separating apparatus.

Figure 1:
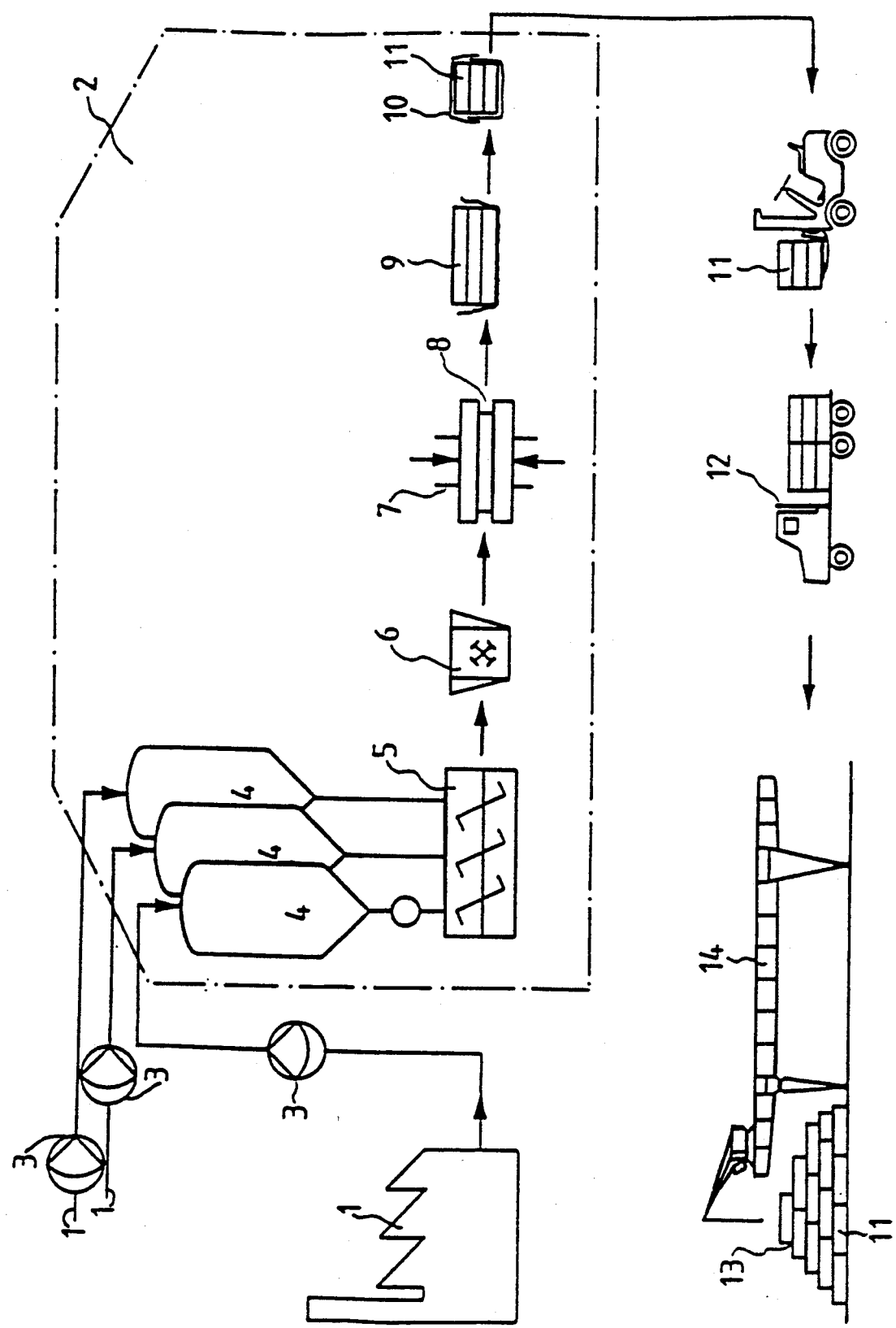
FIG. 1 shows a flow diagram for the process of the invention including pretreatment of the waste.

These pretreatment steps can be carried out either in the waste producer or in a central conditioning plant. The individual partial steps are described below within the framework of one embodiment (see FIG. 1).

1. Transport of the accumulated waste from waste points 1 to a central conditioning plant 2, wherein pneumatic, hydraulic or mechanical conveying plants 3 are used, depending on the consistency and amount of waste, or it is transported by industrial trucks using packages, preferably containers.

2. Intermediate storage of the waste in suitable bunkers, preferably silos 4, having a capacity for at least one day's waste, preferably more than for three days' of each waste.

3. Balancing waste batches of different quality in silo 4, or in continuous or discontinuous solid mixers 5, and optionally diluting with inert materials, such as for example fine rubble, earth, ash, slag, in such a way that mixtures having broad particle size distribution and sufficiently low residual moisture are produced; optional crushing of larger agglomerates using suitable comminution machines 6.

4. Feeding to a hydraulic pressing device 7 installed in the conditioning plant 2, and subsequent pressing into blocks or boards 8 having a base surface area of 1 to 10 $m^2$, preferably 4 to 8 $m^2$, and a thickness of 10 to 2,500 mm, at pressing pressures of 10 to 300 bar, preferably 50 to 200 bar.

The presses to be used can have a similar construction to wood chipboard presses, like one-day and several-day presses with or without moisture-removal capability. Machines of this type are known and are constructed for the chipboard industry. The charging and emptying of the presses is carried out in a similar manner to that in the manufacture of chipboard. Boards of 30 to 300 mm thickness are preferably prepared using presses of this type.

However, presses producing a uniformly pressed block 0.5 to 3 m high, preferably 1 to 2 m high, in one step, can also be used.

5. Optional subsequent stacking of the boards or blocks 8 to give packages 9 0.5 to 3 m high, preferably 1 to 2 m high. Solid, dust-tight and water-tight packing of the blocks or board stacks using plastic films 10. Packing in film is carried out in accordance with processes known per se, such as shrinking, winding and the like. The films used may mark various types of waste by means of different colours.

Loading finished packages 11 onto lorries 12 or railway trucks and then transportation to dump 13.

Ordered stacking of the packages 11 in the dump 13, offset and dovetailed (see FIG. 2), using suitable lifting and conveying means 14. The stacking arrangement can be selected such that larger sections having uniform waste composition are produced.

However, on the other hand, the stacking arrangement can also be selected such that layers of waste packages 15 having below average strength and/or above average elutability are completely encapsulated by layers of waste packages 16, 17, 18 having above average strength and/or below average elutability 16, 17, 18 (see FIG. 3).

8. Covering the finished stacking layers (for example 10 m layers) with stable plastic film 19 of 1 to 3 mm thickness, this enables larger masses of these waste layers (10,000 to 100,000 $m^3$) to be completely surrounded with plastic film of this type, to prevent precipitation water penetrating the waste continuously during the operating phase of the dump 13 (see FIG. 4).

9. Application of drainage layers 20 to the inclined waste layers covered with the plastic film and introduction of vertical drainage shafts 21 between the large waste masses encapsulated with plastic film (see FIG. 5).

Figure 2:
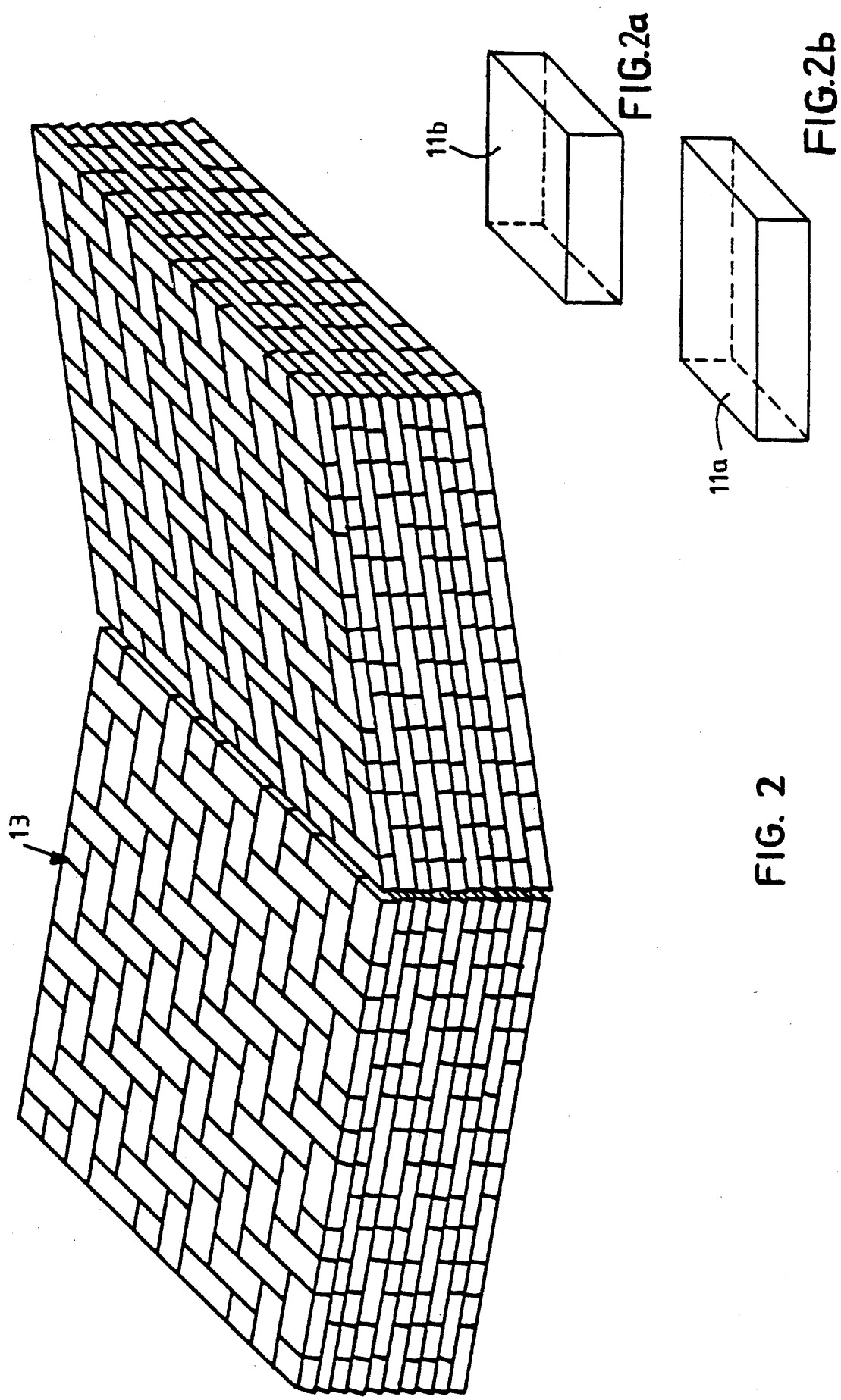
FIG. 2 shows a dump built according to the process of the invention.

FIG. 2 shows the construction and the layering of the dump erected in accordance with the process of the invention in more detail. In particular, the wall-like layering can be seen. The dump extends 30 m to each end from the middle, is 24 m wide and is 10 m high. During the pressing stacking and packing, packages 11 of various sizes in the form of standard blocks 11a shown in FIG. 2a measuring 4 m long, 2 m wide and 1 m high and balancing blocks 11b shown in FIG. 2b measuring 2 m long, 2 m wide and 1 m high are advantageously produced, which are laid according to the pattern shown in FIG. 2. The figure also contains details of sizes for a measured example.

Figure 3:
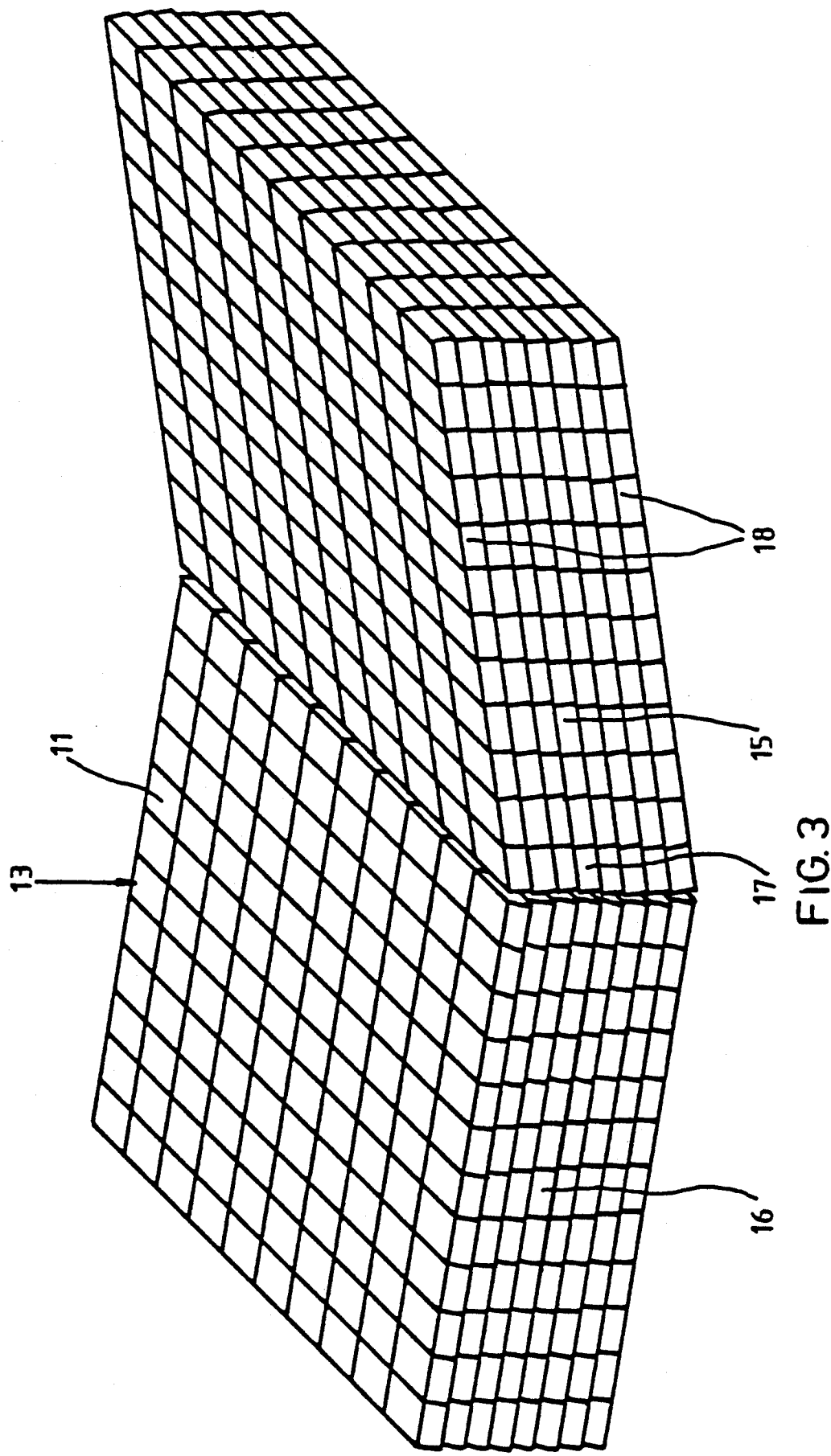
FIG. 3 shows a dump laid according to the same process, in which additional regions of waste packages having below average strength and/or above average elutability are surrounded by waste packages having above average strength and/or below average elutability (encapsulation)

However, the construction can also be made using waste packages 11 of uniform shape, for example using blocks 11b having a quadrilateral base surface area (FIG. 3).

In the dump according to FIG. 3, use is made of the fact that during the manufacture, waste packages 11 having different strength and elutability can be prepared. The dump is then erected so that central layers 15 of waste packages 11 having lower strength and/or higher elutability are completely enclosed by end layers 16, side layers 17, and by upper and lower layers 18 of waste packages having higher strength and/or lower elutability. That is, waste having a higher danger potential is encapsulated in this manner by waste having a lower danger potential.

Figure 4:
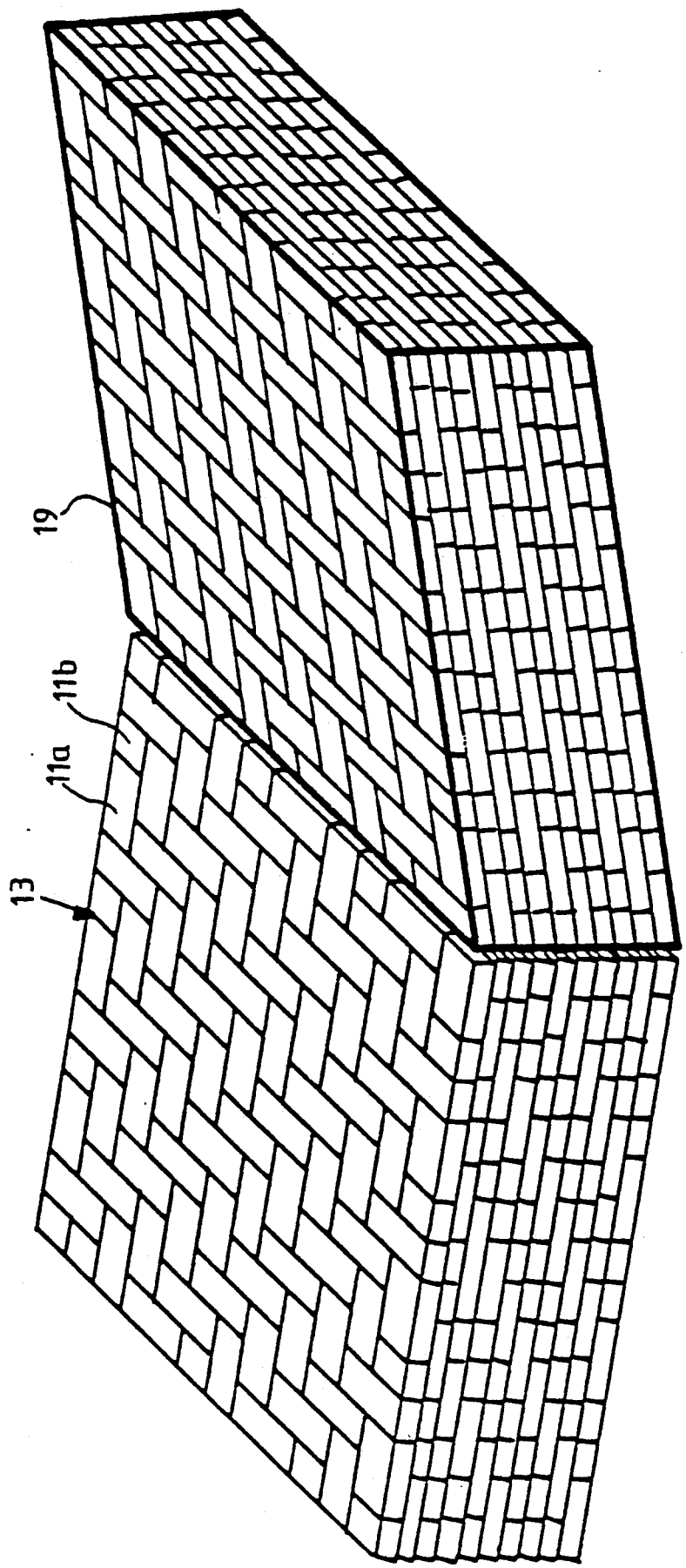
FIG. 4 shows the additional covering of a dump according to FIGS. 1 to 3 with a plastic film.

FIG. 4 shows a further embodiment of a dump layered from pressed waste blocks 11. In this case, the whole of the right part of the dump is surrounded by a plastic film 19 having a thickness of several millimeters. This prevents penetration of precipitation water into this region during the operation of the dump.

Figure 5:
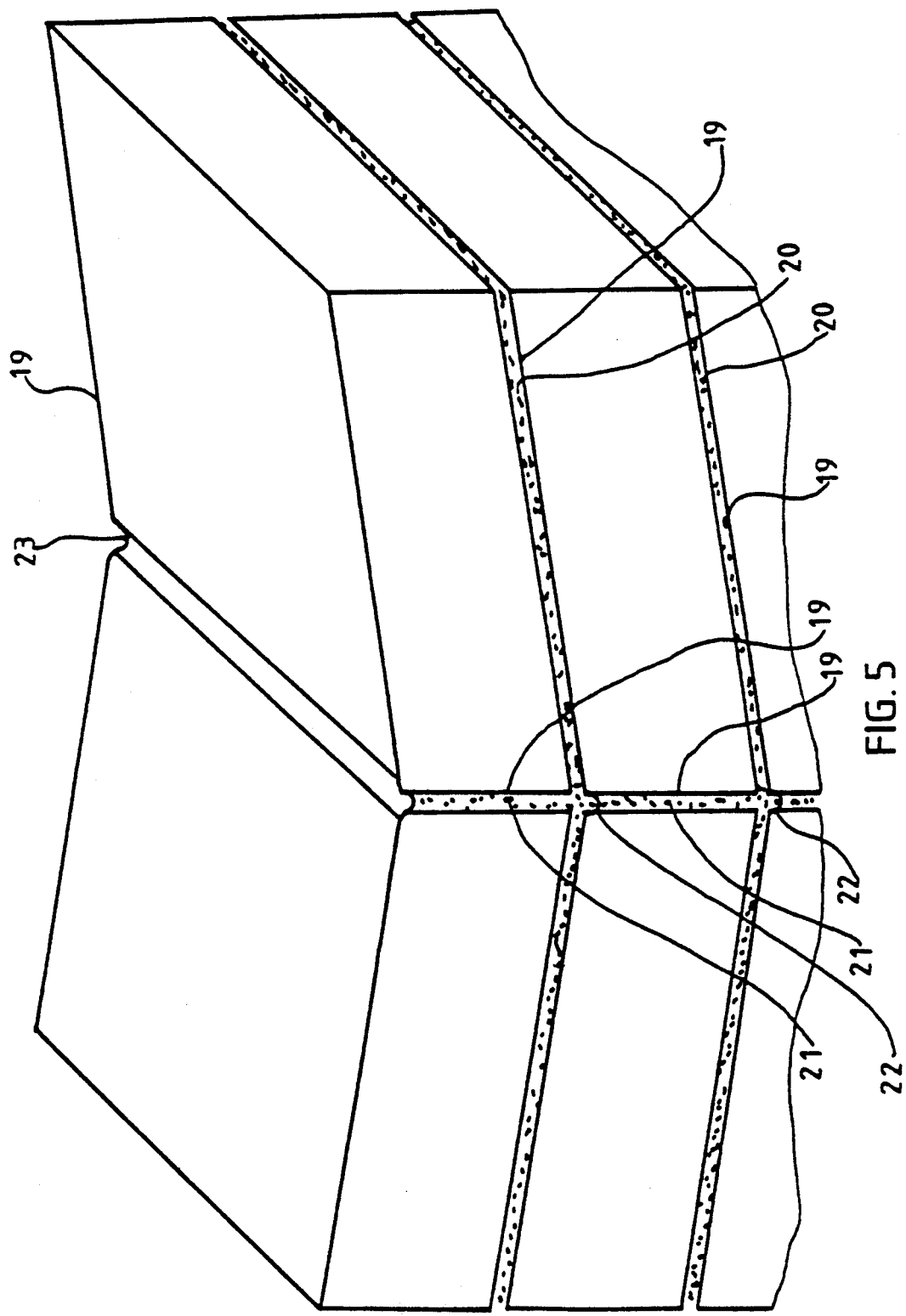
FIG. 5 shows the drainage layers on the inclined waste layers covered with the plastic film and the vertical drainage layers between the large waste masses encapsulated by plastic film.

FIG. 5 shows a drainage system comprising inclined drainage layers 20 on the waste layers covered with the plastic film 19 and the vertical drainage layers 21 between the large waste consist of materials having sand and gravel grain portions with a predominant grain size in the range of 1 mm to 30 mm. The thickness of the inclined drainage layers 20 is, for example 40 mm, the thickness of the vertical drainage layers 21 is, for example 100 mm. The drainage water accumulating at the bottom of each of the drainage layers is collected in perforated/slit drainage pipes (collectors) 22 and passed to a drainage water removal system. The precipitation water falling onto the waste layers covered with plastic film 19 is collected in the depression 23 and flows freely into the rain water channel system. The drainage layers remain dry when the seals perform their function. They ensure that even when the sealing elements fail, there can be no accumulation of liquid in the dump body. The combination of very permeable drainage layers and pressed waste layers having poor permeability reliably prevents the elution of the waste.

The essential steps of the process of the invention are explained once again below using the example of an inorganic special waste having good pourability.

The accumulating waste is transported by means of pneumatic conveying from point 1 of production to a silo 4 of the manufacturing plant 2. A moisture-removing step may be carried out beforehand if necessary. Transportation can also be carried out alternatively by means of containers on lorries The waste can be balanced in silo 4 by continuously rolling the contents.

The waste passes from the silo 4, via a mixer 5 where it may be diluted with inert dry materials, for example fine rubble, to a pressing device 7.

Boards 8 having base surface areas of 2 m×4 m and a thickness of 125 mm are pressed from the special waste in the press 7. The pressure in the press is 100 bar. This achieves a volume reduction of 30%. After pressing, the boards are layered in stacks 9 of 1.25 m and then packed securely with plastic film 10 in a water-tight and dust-tight manner. The type of waste is characterised by the colour of the film.

The packages 11 are then loaded onto lorries 12 using a crane and transported to the dump 13. The lorries 12 are unloaded there using a crane 14 and the packages 11 are deposited in an ordered manner. The construction of the dump 13 is carried out using a dovetailed arrangement of the packages.

A number of methods and processes are mentioned and discussed in the literature for increasing the storage resistance of dump waste and for reducing the permeability and elutability. The addition of cement or other binders to the waste are examples of this.

It has been found, surprisingly, that the resistance of waste can be increased by several powers of ten and the permeability and elutability can be reduced by several powers of ten, by pressing alone using high pressures.

The process of the invention can be used universally for all waste which is available as bulk material and which is free of coarse components, such as large stones, metal pieces and the like.

Of course, the known solidification processes, such as addition of cement or other binders, the recipes of which have to be adapted specially to each waste, can still be used additionally in the process of the invention.

The process of the invention offers the following important advantages for the disposal of waste compared with the modern disposal techniques which are usual at present:

an increase in the resistance of the waste, as a result of a significant increase in the storage resistance of the dump, and a virtually complete avoidance of subsidance, an optimum use of the dump volume by extreme compacting of the waste, a large reduction in the permeability and the elutability of the waste, as a result of a large reduction in the occurrence of polluted drainage water, reduction in the number of journeys to the dump, and an increase in transport safety, a complete avoidance of dust pollution when transporting waste to the dump and when incorporating it into the dump, by means of packing in plastic film, a complete avoidance of contamination of the drainage water by the newly incorporated waste packages, and a large reduction in the occurrence of drainage water.

The process of the invention can be used for waste management of communes and plants of all types which produce waste which can be compacted and which have to be taken it to a dump.

What is claimed is:

1. A process for the disposal of solid waste, comprising: compacting granular bulk material of solid waste without coarse fractions under high pressure of at least 10 bar to form coherent and highly stabilized blocks or boards having low elutability and low permeability, wrapping the blocks or boards in a film or foil in a dust-tight and water-tight manner, and depositing the wrapped blocks or boards into a dump in a regular and brick-like assembly.

2. The process according to claim 1, wherein the waste is transported from individual producers to a central conditioning plant.

3. The process according to claim 2, wherein the waste in the central conditioning plant is stored temporarily in bunkers, having capacities for at least one day's waste.

4. The process according to claim 2, wherein the waste is pretreated by at least one of removing moisture, comminuting, classifying and sorting, to produce the granular bulk material of low residual moisture and without a coarse fraction of metal pieces and stones.

5. The process according to claim 4, wherein the pretreatment comprises mixing different wastes in a silo.

6. The process according to claim 5, wherein the waste is transported from the silo to a pressing device.

7. The process according to claim 1, wherein the waste is pressed using pressures of 10 to 300 bar to form the boards of blocks having 1 to 10 $m^3$ base surface area.

8. The process according to claim 7, wherein the boards are pressed to a thickness of 10 to 1,250 mm, then layered to form stacks 0.5 to 2.5 m, and then packed in film in this form.

9. The process according to claim 7, wherein the blocks are pressed to a height of 0.5 to 2.5 m and then packed in film in this form.

10. The process according to claim 1, wherein LDPE films are used to pack the waste boards or waste board stacks.

11. The process according to claim 10, wherein each type of packed waste is marked by a different color film.

12. The process according to claim 10, wherein the packed waste is loaded into lorries or railway trucks at a conditioning plant and transported to the dump.

13. The process according to claim 10, wherein the pressed and packed waste are placed next to one another and on top of one another on the dump, to form compact layers 5 to 20 m high in offset and dovetailed form.

14. The process according to claim 13, wherein elements of waste, the eluates of which have higher pollutant concentrations, are encapsulated by pressure-resistant elements of low permeability, the eluates of which have lower pollutant concentrations.

15. The process according to claim 14, wherein intermediate covers of HPDE plastic of 1 to 3 mm thickness are placed over the water layers.

16. The process according to claim 15, wherein parts of waste layers, 20 to 40 m wide and 50 to 250 m long, are surrounded at the side by plastic film of 1 to 3 mm thickness.

17. The process according to claim 16, wherein the intermediate covers of plastic remain in the body of waste when the dump is built further, are covered with a layer which is capable of drainage and are connected to a water removal system.

18. The process according to claim 16, wherein material which is capable of drainage in the form of vertical of almost vertical walls is introduced between neighboring units of the waste surrounded with film of 1 to 3 mm thickness, and drainage shafts thus produced are connected to a water removal system.

19. The process according to claim 2, wherein the waste in the central conditioning plant is stored temporarily in bunkers having capacities for 3 to 10 days' of each waste.

20. The process according to claim 1, wherein the waste is pressed using pressures of 50 to 200 bar $m^2$ to form boards or blocks having 2 to 8 $m^3$ base surface area.

21. The process according to claim 7, wherein the boards are pressed to a thickness of 30 to 300 mm thickness, then layered to form stacks 1 to 2 m height, and then packed in film in this form.

22. The process according to claim 7, wherein the blocks are pressed to a height of 1 to 2 m, and then packed in film in this form.

23. The process according to claim 10, wherein the pressed and packed waste are placed next to one another and on top of one another on the dump, to form compact layers approximately 10 m high, preferably in offset and dovetailed form.

* * * * *